United States Patent
Schuler

(10) Patent No.: US 10,267,284 B2
(45) Date of Patent: Apr. 23, 2019

(54) SYSTEM TO CRANK AN ENGINE

(71) Applicant: Valeo Japan Co., Ltd., Saitama (JP)

(72) Inventor: Stephane Schuler, Shenzhen (CN)

(73) Assignee: Valeo Japan Co., Ltd. (JP)

( * ) Notice: Subject to any disclaimer, the term of this patent is extended or adjusted under 35 U.S.C. 154(b) by 0 days.

(21) Appl. No.: 15/855,998

(22) Filed: Dec. 27, 2017

(65) Prior Publication Data

US 2018/0187643 A1  Jul. 5, 2018

(30) Foreign Application Priority Data

Dec. 28, 2016 (CN) .......................... 2016 1 1233462

(51) Int. Cl.
| | |
|---|---|
| *F02N 11/10* | (2006.01) |
| *F02N 11/08* | (2006.01) |
| *G01D 5/14* | (2006.01) |
| *F16H 59/68* | (2006.01) |
| *F16H 59/44* | (2006.01) |
| *F02D 41/00* | (2006.01) |
| *F16H 61/22* | (2006.01) |

(52) U.S. Cl.
CPC .......... *F02N 11/103* (2013.01); *F02N 11/087* (2013.01); *F02N 11/0851* (2013.01); *G01D 5/145* (2013.01); *F02D 41/009* (2013.01); *F02D 2200/502* (2013.01); *F02N 2200/0802* (2013.01); *F16H 2059/446* (2013.01); *F16H 2059/6823* (2013.01); *F16H 2061/223* (2013.01)

(58) Field of Classification Search
CPC .. F02N 11/103; F02N 11/0851; F02N 11/087; F02N 2200/0802; F02D 2200/502; B60K 2028/003

USPC ....................................................... 123/179.3
See application file for complete search history.

(56) References Cited

U.S. PATENT DOCUMENTS

| | | | |
|---|---|---|---|
| 4,262,526 A | 4/1981 | Makita et al. | |
| 4,485,694 A | 12/1984 | Mochida | |
| 5,370,015 A * | 12/1994 | Moscatelli | ............. B60K 37/06 |
| | | | 324/207.2 |
| 5,637,054 A | 6/1997 | Tanaka | |
| 6,073,507 A * | 6/2000 | Ota | ........................ F16H 61/16 |
| | | | 477/906 |

(Continued)

FOREIGN PATENT DOCUMENTS

| | | |
|---|---|---|
| CN | 202481012 U | 10/2012 |
| DE | 19602302 A1 | 3/1997 |

(Continued)

OTHER PUBLICATIONS

English abstract for CN-202481012.
European Search Report dated Apr. 26, 2018.

*Primary Examiner* — Mahmoud Gimie
(74) *Attorney, Agent, or Firm* — Fishman Stewart PLLC

(57) ABSTRACT

A system for enabling an engine to be safely cranked may include a single cranking relay configured to enable the engine to be cranked when activated, a contactless angle sensor for detecting a gear state of a transmission connected with the engine, and a controller. The controller may be configured to check the gear state of the transmission detected by the angle sensor and may allow for activation of the cranking relay when the gear state of the transmission is at one of a Neutral gear state or a Park gear state.

14 Claims, 3 Drawing Sheets

(56) References Cited

U.S. PATENT DOCUMENTS

| | | | | |
|---|---|---|---|---|
| 6,597,071 B2 * | 7/2003 | Hiyama | ............... | F02N 11/103 123/179.3 |
| 2003/0159534 A1 * | 8/2003 | Babin | ............... | F16H 59/105 74/473.12 |
| 2004/0178050 A1 * | 9/2004 | Wylde | ............... | F02N 11/0807 200/61.88 |
| 2005/0000268 A1 * | 1/2005 | Kuwata | ............... | F16H 59/105 73/1.75 |
| 2006/0030451 A1 * | 2/2006 | Takagi | ............... | F16H 59/105 477/34 |
| 2007/0135262 A1 * | 6/2007 | Cho | ............... | F02N 11/103 477/107 |

FOREIGN PATENT DOCUMENTS

| | | |
|---|---|---|
| EP | 1471290 B1 | 10/2004 |
| WO | 2009035423 A1 | 3/2009 |

\* cited by examiner

SYSTEM TO CRANK AN ENGINE

CROSS-REFERENCE TO RELATED APPLICATIONS

This application claims priority to Chinese Patent Application No.: 201611233462.3 filed on Dec. 28, 2016, the contents of which are incorporated herein by reference.

TECHNICAL FIELD

The present invention relates to a system to safely crank an automatic or robotic transmission vehicle engine.

BACKGROUND

Nowadays, many vehicles are equipped with Passive Start function and/or Start-Stop engine management systems;

In case of the Passive Start function, the engine is cranked following a user request (pressing a button for example) when the user identification have been validated and when some conditions are met to safely crank the engine.

In case of a Start-Stop engine management system, the decision to crank is left the engine ECU with the purpose of saving fuel. As for the Passive Start function, the cranking shall only occur when security and safety conditions are satisfied.

From a safety perspective, in order to prevent any vehicle movement while cranking (the feared event), it shall be ensured that the transmission gear state is in either Park (P) or Neutral (N) state.

Translated into an ISO26262 context, this condition shall meet an ASIL B level.

In the prior art, a system featuring an electromechanical switch satisfies the ISO26262 requirements.

Referring to FIG. 1, in which a schematic diagram of the prior art system is shown, the system includes an ECU controller 30, such like a PEPS or EMS ECU, a cranking relay 10 enabling the engine to be cranked and an inhibitor switch 20. The inhibitor switch may also be called Neutral or Park SW (in short PN switch). The inhibitor switch is, in this case, an electromechanical switch assembled directly on or sometimes into the transmission. The inhibitor switch is mechanically coding the transmission gear state in such a way it is in a closed position when the transmission is in the Neutral or Park gear state.

As shown in FIG. 1:

the inhibitor switch 20 has a side connected to the cranking relay actuating coil as well as to a ECU 30 terminal (e.g. "Feedback terminal") allowing it to detect the inhibitor switch 20 state.

the other Inhibitor switch 20 terminal is connected to the ground.

the other cranking relay 10 actuation coil terminal is connected to the ECU 30 (e.g. "High Side Switch terminal") allowing it to control the cranking relay 10.

Hereinafter, the operation of the prior art system will be described.

When the transmission is in the Neutral or Park state, the inhibitor switch 20 is closed, pulling the ECU 30 feedback input terminal and the cranking relay coil 10 to the ground level and electrically enabling the cranking relay 10 actuation. Should a vehicle cranking be required, the controller ECU 30 is checking the inhibitor switch 20 state and, if detect closed (in Neutral or Park state), is actuating the High side switch terminal, powering the cranking relay 10, finally resulting in cranking the vehicle engine.

In the above system, three conditions must be satisfied in order to crank the engine, that is:

the inhibitor switch 20 shall be closed, indicating the transmission is in Neutral or Park gear state;

The controller shall confirm the state of the Inhibitor switch through the FB terminal;

And, when requested, the controller shall activate the cranking relay through the High Side Switch output terminal.

It is to note that, shall any of the condition be missing (not satisfied), the cranking relay 20 can't be electrically actuated. This configuration realizes a logical AND requirement satisfying the ISO 26262 ASIL B level.

It is also to be noted here that, using the same electromechanical inhibitor switch, the safety condition can be met by reversing the logic (e.g. powering one cranking relay 20 terminal and actuating it with a Low Side switch). This configuration would also satisfy the ISO26262 ASIL B level.

The electromechanical inhibitor switch being subjected to mechanical wear out leads in some extreme cases to a functional failure (lost of the cranking ability).

To prevent such situations, a new type of contactless sensors is proposed. This type of contactless sensor mostly uses Hall sensors measuring an angle and outputting that angle rather than a gear box state and, consequently, making it is impossible to immediately replace the electromechanical switch by a contactless component.

Several solutions have been presented, for example, in EP1471290B1, a failure detection device for a rotation angle detection sensor is provided, so as to detect a failure in the sensor. Other solutions propose to convert the angle value into a gear state using external hardware/software solutions.

However, these solutions involve more hardware, making them expensive to implement (2 independent ECUs needed, 2 serially connected relays to achieve the ASIL level). They also require the vehicle system to be substantially modified as to accommodate the new type sensor.

SUMMARY

The present invention is aimed to propose an angle sensor construction that can be embedded in the ISO26262 ASIL B compliant current architecture defined for electromechanical switches, and an object of the present invention is to build a compact, reliable, small volume and cost-efficient system for cranking an engine in a vehicle.

According to an aspect of the present invention, a system for enabling an engine to be safely cranked is provided, the system comprises:

a single cranking relay for enabling the engine to be cranked when being activated;

an angle sensor for detecting gear state of a transmission connected with the engine;

and a controller, wherein the controller is configured to check the gear state of the transmission detected by the angle sensor and allow the cranking relay activation when the gear state of the transmission is in Neutral or Park gear state.

With the present invention, the problem integrating contactless sensors in existing architectures is solved. By using a single angle sensor to take the place of the conventional electromechanical inhibitor switch, the structure of the whole solution remains unchanged, the volume of the whole system can be compact, and the reliability can be improved.

BRIEF DESCRIPTION OF THE DRAWINGS

These and other aspects of the present invention will become apparent to those of ordinary skilled in the art from the detail description of the exemplary embodiments of the present invention with reference to the attached drawings in which.

DETAILED DESCRIPTION OF THE DRAWINGS

Figure 1:
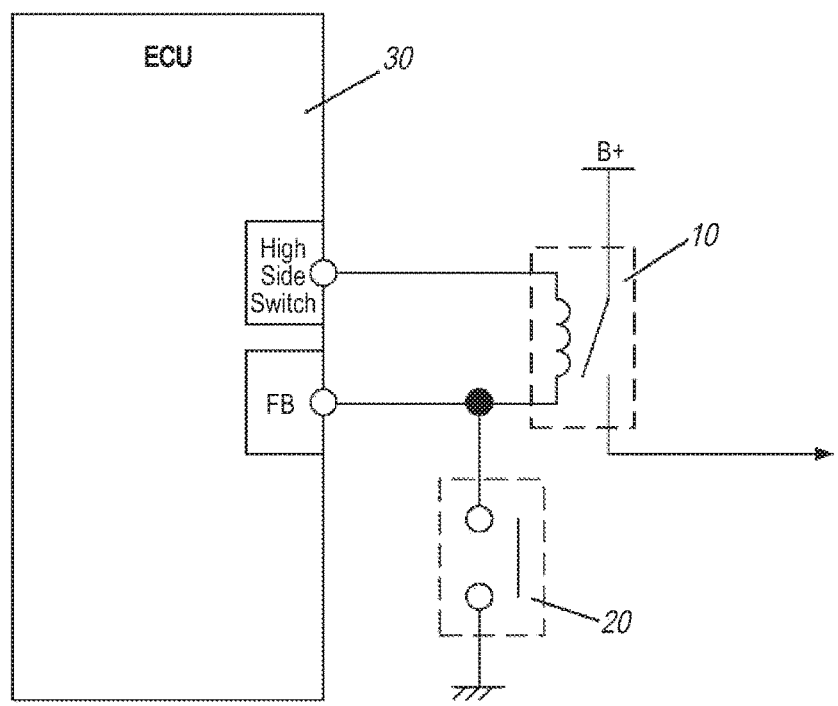
FIG. 1 is a circuit diagram showing a system to crank an engine in the prior art.

Hereinafter, the preferred embodiments of the present invention will be described with reference to the attached figures. It is noted that throughout the FIGs, the same or similar reference numerals are used to indicate the same or similar parts or components.

First Embodiment

Figure 2:
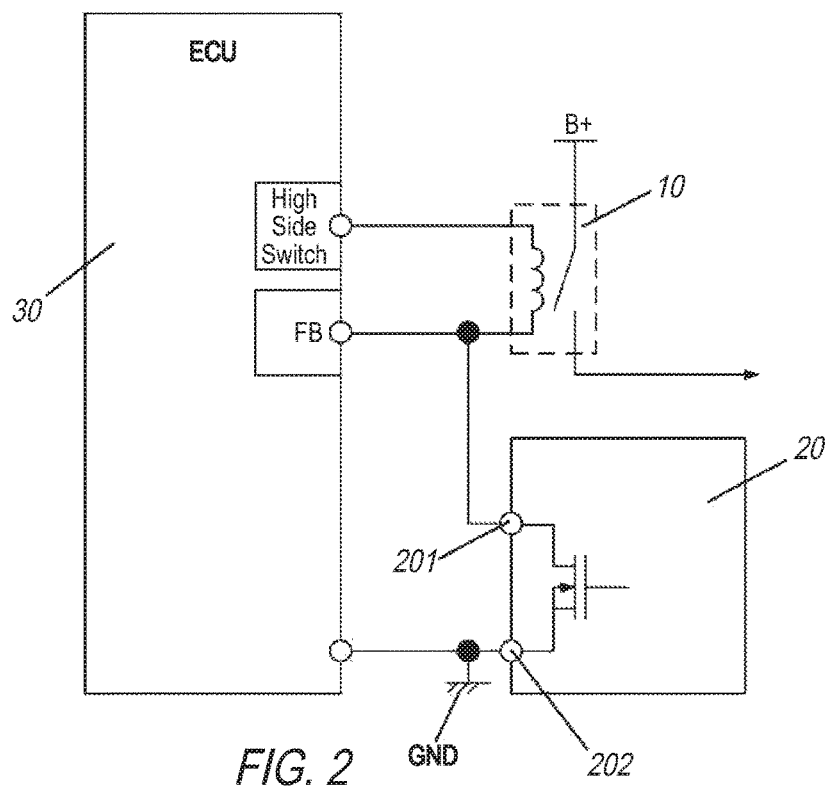
FIG. 2 is a circuit diagram showing a system to crank an engine according to a first embodiment of the present invention.

With reference to FIG. 2, the first embodiment of the present invention will be described, in which FIG. 2 is a circuit diagram showing structure of a system to crank an engine according to the first embodiment of the present invention.

As shown in FIG. 2, the system includes a single cranking relay 10 for enabling the engine to be cranked, an angle sensor 20 to detect a gear state and outputting a data signal indicative of that gear state; and an ECU controller 30 to capture the angle sensor signal and control the cranking relay 10. The ECU controller 30 may be an EMS or a PEPS ECU, but a separate controller or another existing ECU in the vehicle could also be used.

As shown in FIG. 2, the cranking relay 10 output is used to crank the engine by closing the relay circuit to the power supply.

The angle sensor 20 has a first switch output terminal 201 connected to one of the terminal of the cranking relay control coil and also to a terminal of the ECU controller 30, e.g. a Feedback terminal (FB), and the second output terminal 202 connected to the ground (GND). The other terminal of the cranking relay 10 control coil is connected to another terminal of the ECU controller 30, e.g. a High Side switch.

Figure 3:
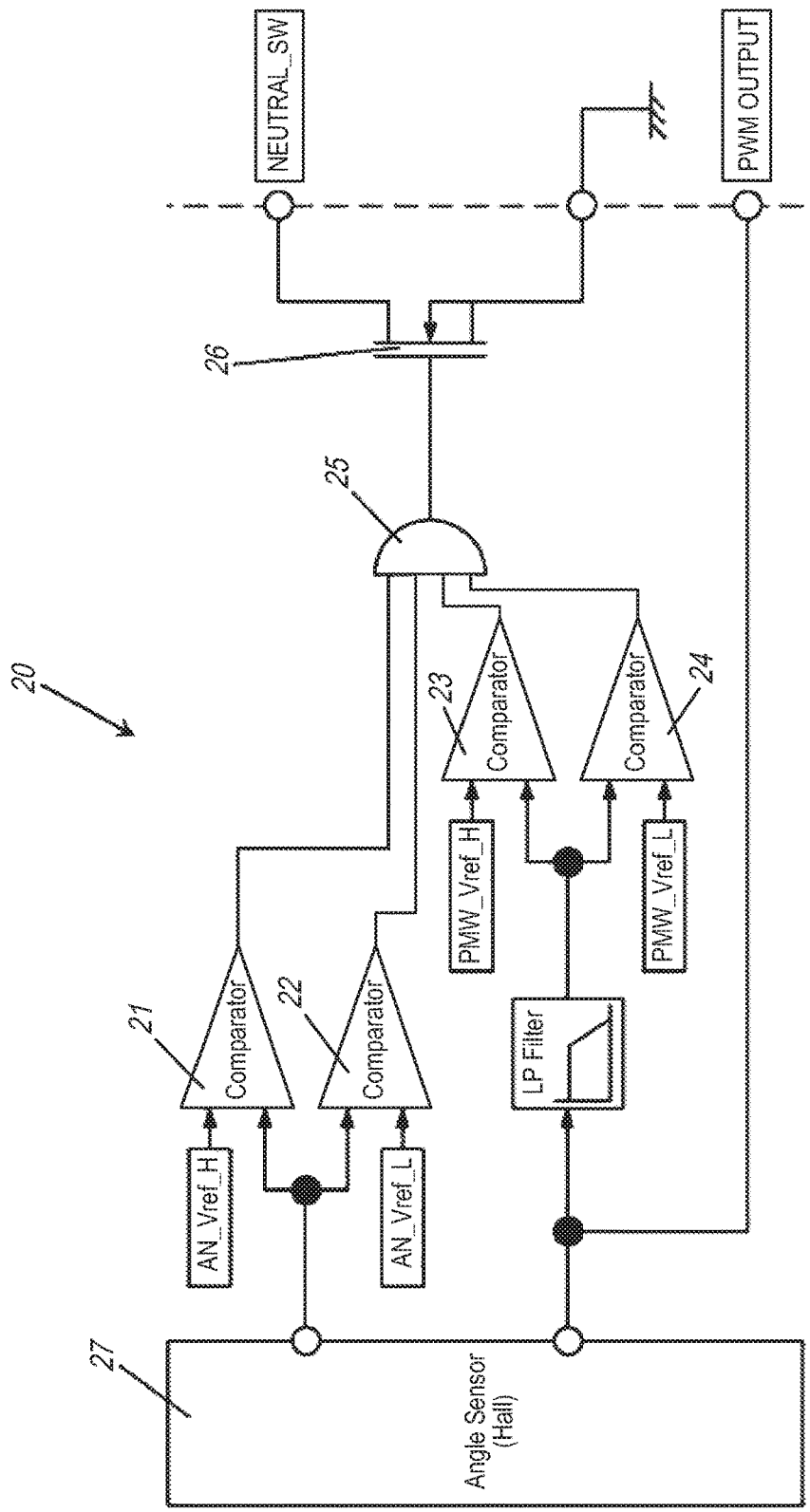
FIG. 3 is a circuit diagram showing structure of an angle sensor used in the system shown in FIG. 2.

As shown in FIG. 3, the angle sensor 20 is a single chip sensor including dual sensing units and a logic output switch 26. The two sensing units are angle sensors, e.g. magnetic sensors for sensing an angle by Hall Effect in contactless manner. Obviously, the present invention is not limited to:

Hall Effect sensors, as other kinds of sensor for sensing angles can also be used.

Single chip sensor, as any combination of 2 sensing units is to satisfy ISO26262 ASIL B requirements The two sensing units are capturing the rotation angle position of the transmission shaft, and acquire, that way, its gear state.

Each sensing unit is outputting a digital or analog signal carrying the angle information. In the present embodiment, one of the sensing unit outputs is an analog signal and the other one a PWM type signal. In such a way to meet the safety requirement, e.g. ISO26262 ASIL B, only when both independent output signals are consistent, i.e. both output signals from the two sensing units indicate that the transmission gear state is in Neutral or Park, can the logic output switch be activated, that is the logic output switch be "closed".

The computation logic, in the above example, is shown in FIG. 3. The analog signal output from the first sensing unit is wired to two comparators 21 and 22 to compare it with an upper and lower limit corresponding to the Neutral or Park gear state angle range.

Specifically, if the analog signal is lower than the upper limit, the first comparator 21 will output a logic "1", and if the analog signal is higher than the lower limit, the second comparator 22 will output a logic "1", that is to say, if the analog signal is within the range between the upper limit and the lower limit, the comparison result is to be a logic "1", meaning that the shaft angle position is within a predetermined rotation angle range corresponding to the Neutral gear or the Park gear.

Similarly, the low pass filtered PWM signal output from the second sensor unit is compared to an upper and a lower limit by using two comparators 23 and 24. If the low pass filtered PWM signal is lower than the upper limit and higher than the lower limit, a logic "1" is output.

All comparison results from the four comparators are wired into a Logic "AND" computed by a logic gate 25. Therefore, only when all the comparison results are logic "1", will the logic gate 25 output a logic "1", activating the logic output switch 26.

While the logic output switch 26 is activated, it will pull the FB ECU controller terminal input down to GND and, at the same time, it will connect the cranking relay 10 control coil to GND, thus, enabling its activation.

The logic output switch can be implemented by a transistor, such as a power transistor.

Should a request to crank take place and should the ECU controller FB terminal detect a ground level, the ECU controller 30 will control its High Side Switch output, powering the cranking relay coil. The cranking relay coil being enable by the angle sensor switched, the cranking relay is switched to "closed", resulting in the engine crank.

With the present invention, the conventional electromechanical inhibitor switch can be substituted by the angle sensor build according to the FIG. 3 hardware construction. Since the angle sensor integrates two independent sensing units and the hardware needed to compute a logic state output corresponding the Neutral or Park transmission state, the conventional system structure for connecting the inhibitor switch is hardly amended. Migration costs from the electromechanical Inhibitor SW to the contactless pendant are consequently reduced with no additional hardware needed external the contactless inhibitor SW. With the present contactless inhibitor switch, realizing the same function like the conventional electromechanical inhibitor switch, ISO26262 ASIL requirements are satisfied the same way.

In addition the present invention's angle is implemented using hardware, making it robust and reliable in the high temperature environment it is purposed to operate. The 2 sensing units and the relevant computation hardware can be integrated, if wished, into a single chip. The hardware nature of the invention avoids problems related to embedding a software solution in a high temperature environment.

Variants to the First Embodiment

Figure 4:
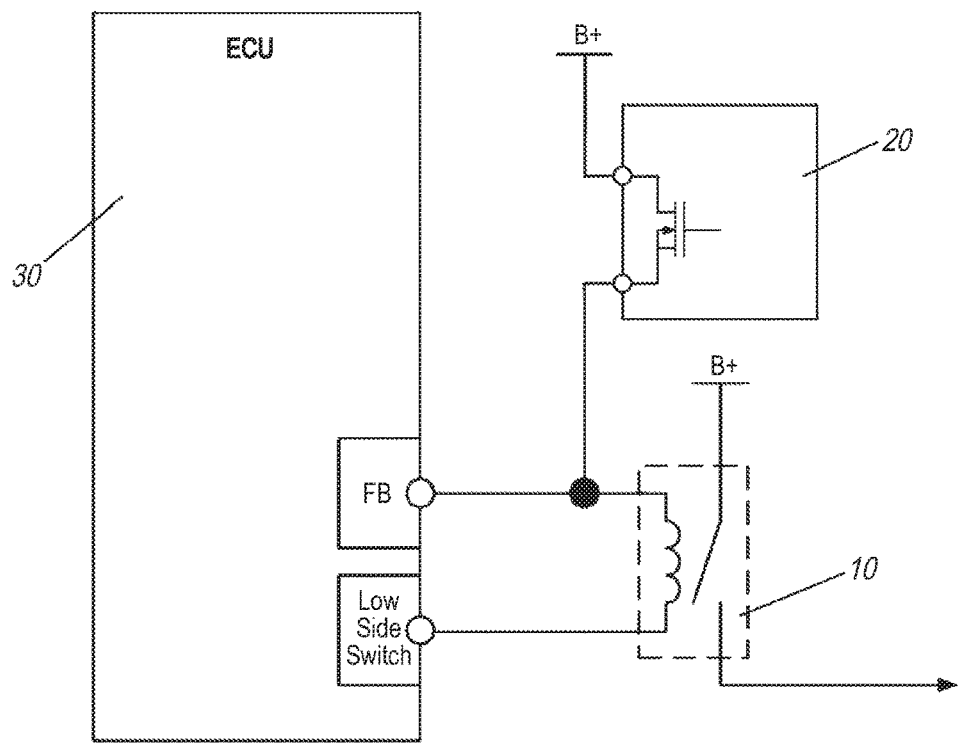
FIG. 4 is a circuit diagram showing a variant to the first embodiment of the present invention.
Figure 5:
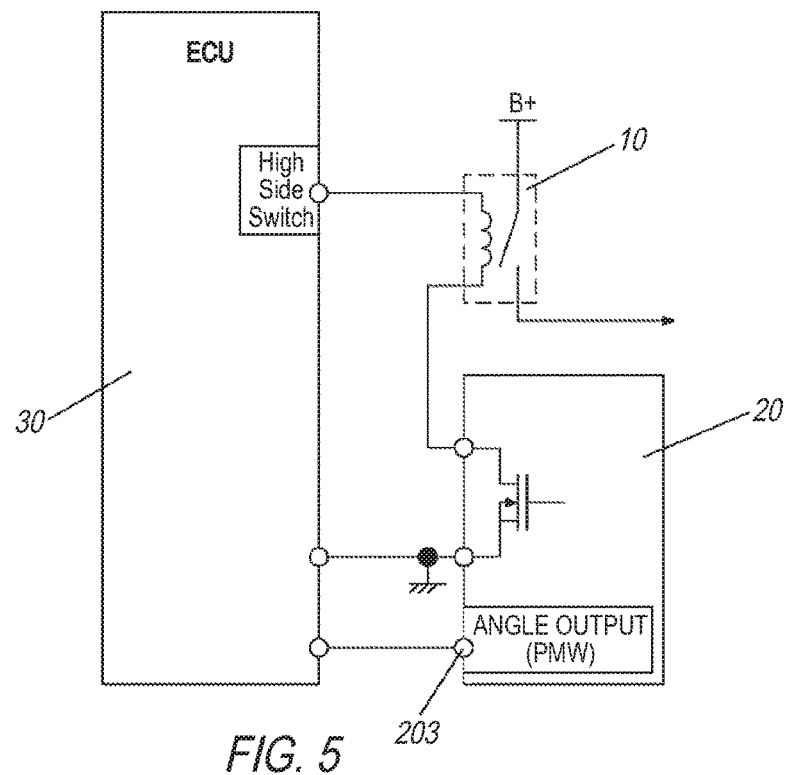
FIG. 5 is a circuit diagram showing a system to crank an engine according to a second embodiment of the present invention.

Referring to FIG. 4, a variant to the first embodiment will be described. In the first embodiment as above described, the angle sensor is connected between the cranking relay and the ground. It would also be possible to connect the angle sensor between the Power Supply and the cranking Relay using a reversed logic. As shown in FIG. 4, the angle sensor 20 is connected between a Power Supply and one terminal of the cranking relay control coil. In this situation, when the logic output switch of the angle sensor is "closed", the ECU controller 30 will detect the high level rather than the ground, meantime, the power supply is supplied to the terminal of the cranking relay control coil, and in response to the high level being detected by the Feedback terminal of the ECU controller, the ECU controller can activates the relay through a Low side switch. Since the remaining part of the variation is same as that in the first embodiment, it will not be described in additional details.

The Second Embodiment

Hereinafter, the second embodiment of the present invention will be described with reference to FIG. 4. The second embodiment is different from the first embodiment as above described mainly in that an angle output signal is additionally output from a third terminal 203 of the angle sensor and is received by the ECU controller. The remaining of the second embodiment is the same as that in the first embodiment, and thus will not be further described in detail.

As shown in FIG. 4, in addition to the output of the logic output switch 26, the angle sensor further includes a third output terminal 203 to output a signal indicative of the angle position of the transmission shaft. Referring to FIG. 4 in combination with FIG. 3, the additional signal can be one of the signals output from the two sensor units, for example, in this embodiment, it is the PWM output signal. The controller 30 will receive the PWM output signal from the third output terminal 203, and determine the transmission gear state from that PWM output signal. At the same time, the controller 30 will also acquire the state of the logic output switch 26, and only when both the PWM output signal and the output of the logic output switch indicate that the transmission is at the Neutral or Park gear, can the High Side Switch of the controller be activated. As above described with reference to FIG. 2, the cranking relay 10 actuation coil is powered, closing the cranking relay and finally resulting in cranking the engine. In this configuration, the controller ECU 30 is realizing an additional level of comparison between the signals outputted by the inhibitor switch resulting in a higher level of confidence in the angle value integrity since it provides an additional way to diagnose the switch 26.

Variant to the Second Embodiment

It would be actually possible to achieve the safety level, by only having the ECU 30 to only capture the PWM signal without acquiring the switch state.

In the above, the present invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive manner.

What is claimed is:

1. A system for enabling an engine to be safely cranked, comprising:
a single cranking relay configured to enable the engine to be cranked when activated;
a contactless angle sensor for detecting a gear state of a transmission connected with the engine; and
a controller, wherein the controller is configured to:
check the gear state of the transmission detected by the angle sensor; and
allow for activation of the cranking relay when the gear state of the transmission is at one of a Neutral gear state or a Park gear state;
the contactless angle sensor is configured to detect a rotation angle of a shaft in the transmission to determine the gear state of the transmission;
the contactless angle sensor is configured as two sensor units;
a logic gate for outputting a logic output switch activation signal only when an output signal from each of the two sensor units are both signals corresponding to the Neutral gear state or the Park gear state; and
a logic output switch for outputting a logic state signal to the controller that permits activation of the cranking relay based on the logic output switch activation signal output from the logic gate.

2. The system according to claim 1, wherein the contactless angle sensor is a magnetic angle sensor.

3. The system according to claim 1, wherein the logic output switch is integrated into the contactless angle sensor and outputs the logic state signal corresponding to one of the Neutral gear state or the Park gear state in response to receiving the logic output switch activation signal.

4. The system according to claim 1, wherein the two sensor units independently sense the rotation angle of the shaft, and the logic output switch outputs the logic state signal computed from the respective output signals from the two sensor units only when both of the respective output signals indicate that the gear state is in the Neutral gear state or the Park gear state.

5. The system according to claim 1, wherein the logic output switch has one side connected to one terminal of a coil of the cranking relay, and another side connected with a ground and the controller to allow the controller to check the logic state signal of the logic output switch, and wherein another terminal of the coil of the cranking relay is connected to the controller to allow the cranking relay to be activated by the controller.

6. The system according to claim 5, wherein the contactless angle sensor has an angle output connected with the controller.

7. The system according to claim 6, wherein the controller is configured to check the logic state signal of the logic output switch and receive the angle output of the contactless angle sensor, and the cranking relay can only be activated when the logic state signal of the logic output switch and the angle output both indicate that the transmission is in the Neutral gear state or the Park gear state.

8. The system according to claim 1, wherein the logic output switch has one side connected with a power supply, and another side connected with one terminal of a coil of the cranking relay and the controller to allow the controller to check the logic state signal of the logic output switch, and wherein another terminal of the coil of the cranking relay is connected to the controller to allow the cranking relay to be activated by the controller.

9. The system according to claim 8, wherein the contactless angle sensor has an angle output connected with the controller.

10. The system according to claim 9, wherein the controller is configured to check the logic state signal of the logic output switch and receive the angle output of the contactless angle sensor, and the cranking relay can only be activated when the logic state signal of the logic output switch and the angle output both indicate that the transmission is at the Neutral gear state or the Park gear state.

11. The system according to claim 1, wherein the two sensor units are connected to the logic gate, the logic gate is connected to the logic output switch, the logic output switch shifts from an inactive logic state to an active logic state when the logic output switch activation signal is received from the logic gate, and the logic state signal corresponds to the active logic state.

12. The system according to claim 1, wherein the two sensor units include a first sensor and a second sensor each configured to independently sense the rotation angle of the shaft, and wherein the output signal of the first sensor is a digital signal of the rotation angle of the shaft and the output signal of the second sensor is an analog signal of the rotation angle of the shaft.

13. The system according to claim 1, wherein:
the contactless angle sensor is a single chip sensor and includes a plurality of comparators, the logic output switch, and the logic gate;
the two sensor units include a first angle sensor and a second angle sensor each configured to independently sense the rotation angle of the shaft, the first angle sensor connected to a first subset of the plurality of comparators and the second angle sensor connected to a second subset of the plurality of comparators; and
the first subset of the plurality of comparators and the second subset of the plurality of comparators configured to compare the output signals received from the first angle sensor and the second angle sensor, respectively, with an upper limit and a lower limit of a predetermined rotation angle range corresponding to the Neutral gear state or the Park gear state and provide a comparison result to the logic gate.

14. The system according to claim 13, wherein the logic gate is configured to compute a logic state based on the comparison results received from the plurality of comparators and output the logic output switch activation signal only when all of the comparison results indicate that the rotation angle of the shaft is within the upper limit and the lower limit of the predetermined rotation angle range.

* * * * *